Nov. 15, 1960   H. T. SCHWINGE   2,960,192
LIQUID BRAKING APPARATUS
Filed Jan. 15, 1958   2 Sheets-Sheet 1
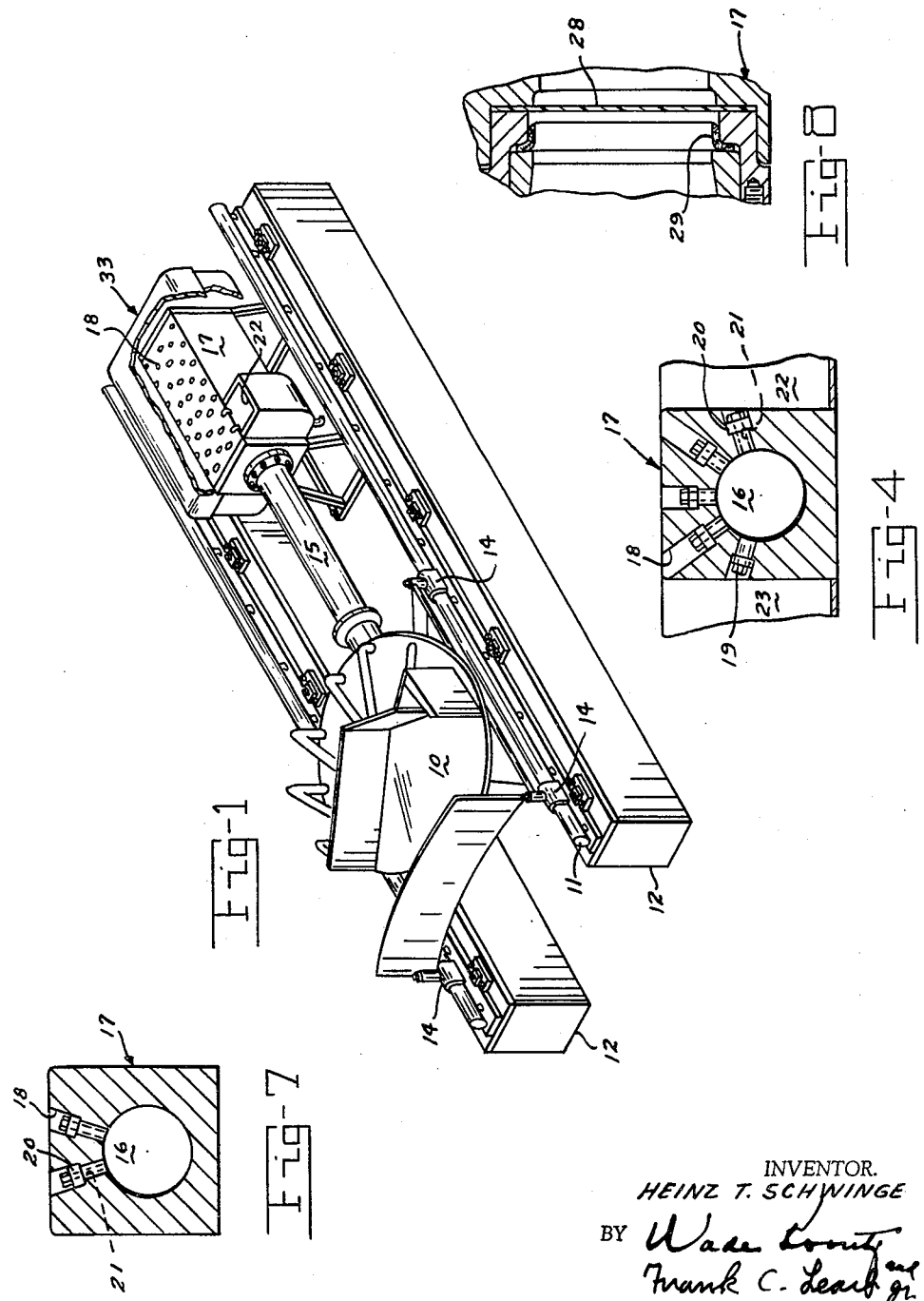
INVENTOR.
HEINZ T. SCHWINGE
BY Wade Loomis
Frank C. Leach
ATTORNEYS

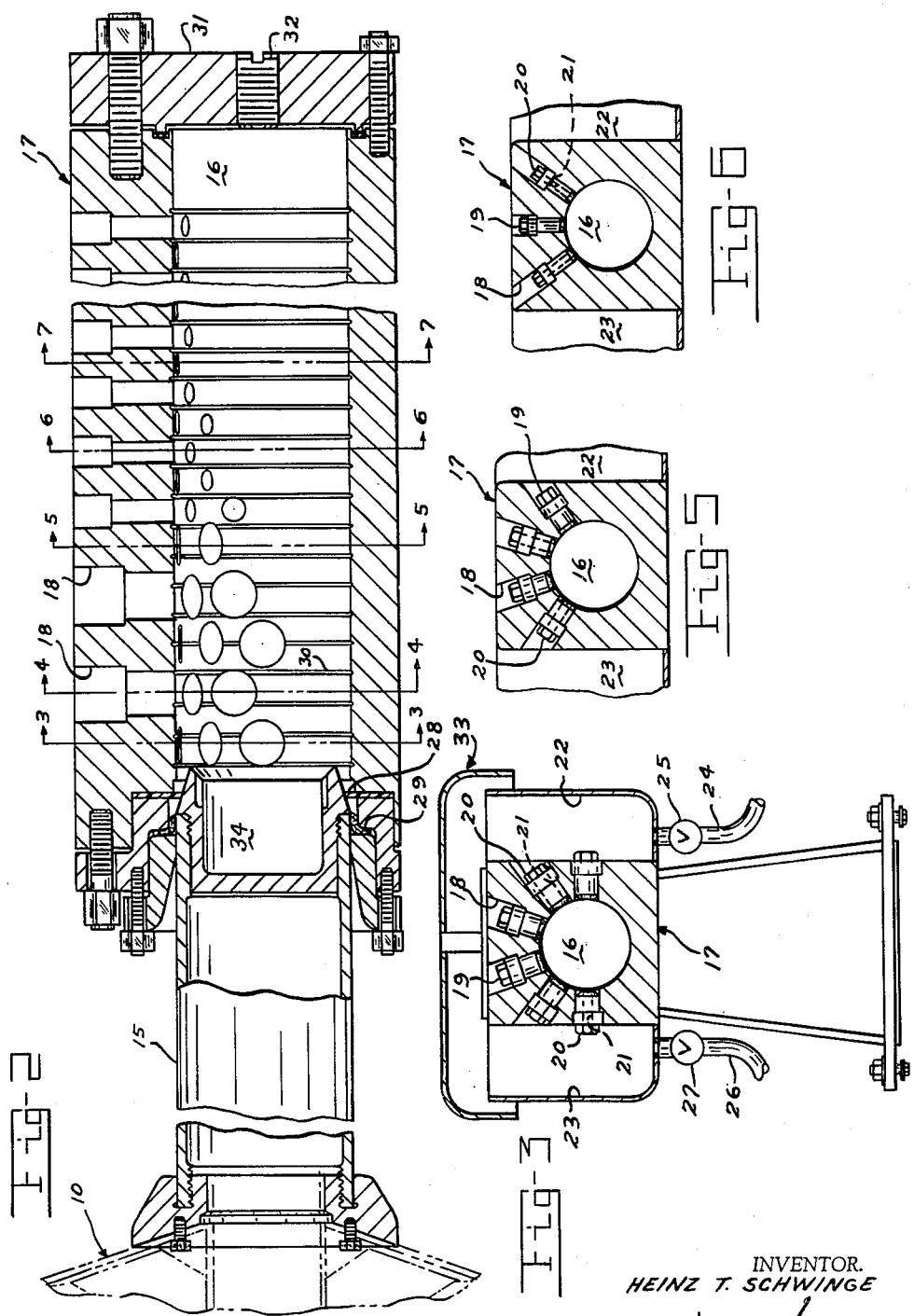

United States Patent Office

2,960,192
Patented Nov. 15, 1960

---

2,960,192

LIQUID BRAKING APPARATUS

Heinz T. Schwinge, Alamogordo, N. Mex., assignor to the United States of America as represented by the Secretary of the Air Force Filed Jan. 15, 1958, Ser. No. 709,125

2 Claims. (Cl. 188—94)

(Granted under Title 35, U.S. Code (1952), sec. 266)

The invention described herein may be manufactured and used by or for the United States Government for governmental purposes without payment to me of any royalty thereon.

This invention relates to a liquid braking device and, more particularly, to a device employing liquid to stop a mass moving rapidly along a predetermined path in a very short period of time.

In the use of high speed vehicles, such as rocket driven carriages gliding on tracks carrying aerodynamic test models and personnel, it is desired to stop such vehicles rapidly and smoothly. It also is desired to stop these vehicles in a predetermined length of time with a specific pattern of deceleration. The present invention satisfactorily solves these problems by providing a device in which the rate of deceleration and the rate of change of deceleration may be varied as desired. In experimental tests of the present invention, the deceleration varied from five g. to 140 g. with the rate of change of deceleration varying from 150 g. per second to 12,000 g. per second.

An object of the present invention is to provide a device for completely stopping a moving mass in a predetermined deceleration-time pattern.

Another object of the invention is to provide a device employing liquid, preferably water, to completely stop a moving mass.

A further object of this invention is to provide a device for completely stopping a moving mass in which the deceleration and/or the rate of change in deceleration may be varied as desired.

Other objects of this invention will be readily perceived from the following description.

This invention relates to a liquid brake for a mass having a member extending therefrom and moving along a predetermined path. The liquid brake includes a housing having a cavity therein for cooperation with the extending member to stop the mass. The cavity is filled with liquid, which is retained in the cavity by suitable means. Means connect the interior of the cylinder with the exterior of the housing to regulate the flow of liquid therethrough from the interior of the cylinder when the extending member moves through the length of the cavity to stop the mass in accordance with a predetermined deceleration-time pattern. Means is employed to cooperate with the extending member to seal the space between the extending member and the wall of the cavity to prevent leakage of liquid therethrough.

The attached drawings illustrate a preferred embodiment of the invention in which Fig. 1 is a perspective view of the liquid brake of the present invention including the moving mass and its track;

Fig. 2 is a sectional view of part of the liquid brake with part of the piston being inserted within the housing of the liquid brake;

Fig. 3 is a sectional view taken along the line 3—3 of Fig. 2 with the support structure for the housing of the liquid brake and the hood for the housing also being shown;

Fig. 4 is a fragmentary sectional view taken along the line 4—4 of Fig. 2;

Fig. 5 is a fragmentary sectional view taken along the line 5—5 of Fig. 2;

Fig. 6 is a sectional view taken along the line 6—6 of Fig. 2;

Fig. 7 is a sectional view taken along the line 7—7 of Fig. 2; and

Fig. 8 is a fragmentary sectional view of a portion of the housing of the liquid brake of the present invention.

Referring to the drawings and particularly Fig. 1, there is shown a mass 10 movable along a track 11 consisting of two rods, which are secured to supports 12. The mass 10 includes members 14 cooperating with the rods of the track 11 to guide the mass 10 along a predetermined path. The mass 10 receives motive power from a suitable source (not shown).

The mass 10 includes a member 15, such as a piston, extending therefrom and moving in advance of the remainder of the mass 10 as it progresses along the track 11. The piston 15 is in axial alignment with a cylindrical cavity 16, which is formed within a housing 17 of the liquid brake of the present invention. The cavity 16 has a tapered entrance opening in axial alignment with the piston 15 to permit easy insertion thereof into the cavity.

The housing 17 has a plurality of passages 18 extending therethrough to connect the interior of the cavity 16 with the exterior of the housing 17. In one constructed device of the present invention, the passages of the first five rows adjacent the entrance opening of the cavity 16 had diameters of 1.625 inches and the rows were spaced 1.625 inches apart. The first and third rows of passages consisted of six passages while the second and fourth had five passages and the fifth set of passages having diameters of 1.625 inches had four passages. As shown in Fig. 3, the six passages 18 are spaced about a semi-circle in such a manner that the axis of each passage is 36° from the axis of the next adjacent passage. Similarly, the axes of the passages of the second and fourth rows were angularly spaced 36° apart but the axis of each passage of these rows was 18° out of alignment with the passages of the first and third rows (see Figs. 3 and 4). The fifth row having passages with a diameter of 1.625 inches has axes of its passages disposed as shown in Fig. 5 wherein the axes are angularly displaced 36° with respect to each other and are axially in alignment with the passage of the first and third rows except that the two lowermost passages have been removed.

The remaining 37 rows of passages have diameters of .750 inch in this constructed embodiment with the distance between each line of passages being one inch. The first row having passages with a diameter of .750 inch consisted of five passages spaced in the same manner as shown in Fig. 4. The second and fourth rows with passages having diameters of .750 inch consisted of four passages spaced in the same manner as shown in Fig. 5. The third and fifth and all other odd numbered rows of passages contained only three passages with the angle between the axes of adjacent passages being 36° as shown in Fig. 6. The remaining sets of passages beginning with the sixth row of passages having diameters of .750 inch and continuing through each even numbered passage thereafter contained only two passages having axes disposed 36° apart, as shown in Fig. 7. The particular relationship of the number of holes and their diameters of this specific embodiment is merely shown for illustration to indicate how the rows of passages and their relationships may be employed. It will be understood that this relationship could be varied as desired.

Each of the passages 18 extending from the interior of the cavity 16 to the exterior of the housing 17 has a plug disposed therein. Some of the plugs, indicated by 19, do not have any passage therethrough to completely close the passages 18 in which they are disposed. Other of the plugs, indicated by 20, have passages 21 extending therethrough to permit flow of liquid from the interior of the cavity 16 to the exterior of the housing 17. The size of the passage 21 in each of the plugs 20 may be varied, as desired, depending on the deceleration-time pattern desired to stop the moving mass. The sizes of the passages 21 shown in the plugs 20 in Figs. 3–7 are merely for purposes of illustration as is the ratio of the number of plugs 19 to the number of plugs 20. For clarity purposes, the plugs 19 and 20 have not been shown in Fig. 2.

Reservoirs 22 and 23 (see Fig. 3) are disposed on each side of the housing 17 adjacent its entrance opening (see Fig. 1). Liquid, which is preferably water, is supplied to the reservoirs 22 and 23 through their open tops to fill the cavity 16 and the reservoirs. The liquid flows into the cavity 16 from the reservoirs 22 and 23 through the passages 21 in the plugs 20.

After the use of the brake, the reservoir 22 is drained through a conduit 24 by opening a valve 25 therein. Similarly, the reservoir 23 is drained through a conduit 26 by opening a valve 27 therein. It will be understood that the cavity 16 and the passages 21 in the plugs are drained automatically when the piston 15 is removed from the cavity 16.

In order to retain the liquid within the cavity 16, it is necessary to seal the entrance opening by a frangible member 28, which is preferably made of a phenolic resin and is easily broken by insertion of the piston therethrough. When the piston 15 breaks the frangible member 28, it is necessary to provide a seal between the piston 15 and the wall of the cylindrical cavity 16 to prevent leakage of liquid therebetween. A gasket 29, which is preferably made of leather (see Figs. 2 and 8), cooperates with the piston 15 to form this seal. As the piston 15 advances through the cavity 16, a plurality of labyrinth seals are formed between the piston and the interior of the cavity 16 by grooves 30, which are formed in the wall of the cavity 16. This insures that all of the liquid flows from the cavity through the passages 21 in the plugs 20, which are disposed in the passages 18, to give the desired braking effect.

If the pressure of the liquid within the cavity 16 exceeds a predetermined value, it is necessary to quickly release the pressure of the liquid from the cavity 16 to prevent any damage to the apparatus and eliminate danger to personnel adjacent thereto. Accordingly, an end wall 31, which is remote from the entrance opening of the cavity 16, has a safety plug 32 therein to vent the cavity 16 when the pressure therein exceeds a predetermined value.

As the piston 15 moves through the cavity 16 and forces the liquid therefrom through the passages 21 in the plugs 20, which are mounted in the passages 18, the liquid sprays therefrom very rapidly. In order to control the spray of this liquid, a hood 33 (see Fig. 3) is mounted above the housing 17 and supported thereby. This hood 33 directs the liquid flowing from the passages 21 of the plugs 20 downwardly between the portions of the track 11. It will be understood that it is necessary to remove the hood 33 to fill the reservoirs 22 and 23 and the cavity 16.

Considering the operation of the present invention, the ratio of the number of plugs 19 to the number of plugs 20 in each row of passages 18 depends upon the desired deceleration-time pattern. Likewise, the size of the passages 21 in each of the plugs 20 depends upon the deceleration-time pattern desired. Thus, a plurality of patterns may be produced through the use of this invention. As the movable mass 10 progresses along the track 11, the piston 15 enters the tapered entrance opening of the cavity 16 and breaks the frangible sealing member 28. The piston has a recess 34 in the end entering the cavity 16. The air volume within this recess 34 is compressed at impact of the piston 15 with the frangible member 28 to thereby prevent a shock. After the frangible member 28 is broken, the piston 15 advances through the cavity to force the liquid therefrom through the passages 21 in the plugs 20. As previously mentioned, the gasket 29 cooperates with the periphery of the piston 15 to provide a seal therebetween to prevent leakage of liquid from the interior of the cavity 16 through its entrance opening. As the piston 34 moves through the cavity 16 and passes a particular row of passages 18, it is desired to prevent leakage from the remainder of the cavity 16 into the row of passages 18, which have already been passed. Each circumferential groove 30 forms a labyrinth seal with the piston 15 to prevent any leakage from the remainder of the cavity to the rows of passages 18, which have already been passed by the head of the piston 15. The size of the passages 21 in the plugs 20 is such that the mass 10 is stopped by the time that the piston 15 approaches the end wall 31 of the housing.

It should be observed that substantially all of the passages are disposed above the center line axis of the cavity 16. This results in the liquid being forced upwardly to provide the desired braking effect. While the liquid is preferably water since there is no need to recover the water, it will be understood that other liquids may be employed, if desired.

An advantage of this invention is that it provides very quick stops of a rapidly moving mass in accordance with a predetermined deceleration-time pattern.

For purposes of exemplification, a particular embodiment of the invention has been shown and described according to the best present understanding thereof. However, it will be apparent that changes and modifications in the arrangement and construction of the parts thereof may be resorted to without departing from the true spirit and scope of the invention.

I claim:

1. A liquid brake for a mass having a member extending therefrom and moving along a predetermined path, said liquid brake including a housing having a cavity formed therein in axial alignment with the extending member, said housing having therein a plurality of rows of passages of varying number and size spaced along the length of the cavity in angular relation one to the other to connect the interior of the cavity with the exterior of the housing, removable plug means disposed within each of said passages, some of said plug means being adapted to close some of the passages and the remainder of said plug means being adapted to vary the size of the remainder of the passages to selectively regulate the liquid flow therethrough to provide a predetermined deceleration-time pattern to stop the mass, means to fill the cavity with liquid, frangible means to seal the entrance opening to the cavity to retain the liquid within the cavity, gasket means disposed adjacent the entrance to the cavity to cooperate with the extending member on insertion of the extending member into the cavity to prevent liquid leakage through the entrance of the cavity between the member and the wall of the cavity, said wall of said cavity having a plurality of spaced annular grooves therein disposed peripherally of said cavity and in normal alignment therewith to cooperate with the extending member to form labyrinth seals, means at the end of the cavity remote from the entrance to release the liquid from the cavity if its pressure exceeds a predetermined value, said extending member breaking the frangible member on insertion into the cavity and forcing the liquid through said unclosed passages whereby the mass is stopped in accordance with the predetermined deceleration-time pattern.

2. A water brake for a mass having a piston extending therefrom and moving along a predetermined path, said water brake including a housing having a cylindrical cavity formed therein in axial alignment with the piston, said cavity having an entrance opening for insertion of the piston when the mass moves along the predetermined path, said housing having a plurality of rows of passages therein to connect the interior of the cavity with the exterior of the housing, said passages being spaced along the length of the cavity with substantially all of the passages being disposed with their entrances to the interior of the cavity above the axis of the cylindrical cavity, removable plug means disposed within each of said passages to close some of the passages, some of said removable plug means being adapted to vary the size of the remainder of the passages to regulate the water flow therethrough to provide a deceleration-time pattern for stopping the moving mass, means to fill the cavity with water, a plurality of spaced annular grooves disposed peripherally of said cavity and in normal alignment therewith for cooperating with said piston to form labyrinth seals, frangible means to seal the entrance opening to the cavity to retain the water within the cylindrical cavity, gasket means disposed adjacent the entrance to the cylindrical cavity to cooperate with the piston on insertion of the piston into the entrance opening of the cavity to prevent water leakage through the entrance of the cavity between the piston and the wall of the cavity, said piston breaking the frangible means on insertion into the cavity and forcing the water through said unclosed passages whereby the mass is stopped in accordance with the predetermined deceleration-time pattern.

References Cited in the file of this patent

UNITED STATES PATENTS

| | | |
|---|---|---|
| 874,150 | Young | Dec. 17, 1907 |
| 880,617 | Bach | Mar. 3, 1908 |
| 984,377 | Kilgour | Feb. 14, 1911 |
| 1,567,515 | Kijima et al. | Dec. 29, 1925 |
| 2,744,587 | Beck | May 8, 1956 |
| 2,846,029 | Cawley | Aug. 5, 1958 |

FOREIGN PATENTS

| | | |
|---|---|---|
| 1,057,048 | France | Oct. 28, 1953 |
| 371,893 | Germany | Mar. 22, 1923 |
| 655,030 | Great Britain | July 4, 1951 |